US008065177B2

(12) United States Patent
Puccio et al.

(10) Patent No.: US 8,065,177 B2
(45) Date of Patent: Nov. 22, 2011

(54) PROJECT MANAGEMENT SYSTEM AND METHOD

(75) Inventors: Kendall Puccio, Jacksonville, FL (US); David B. Wells, San Francisco, CA (US); Linda Wheeler, Glenmont, NY (US); Cliff Deen, McKinney, TX (US); Bill Bradlyn, Charlotte, NC (US); Sharon McCollom, Denton, TX (US)

(73) Assignee: Bank of America Corporation, Charlotte, NC (US)

( * ) Notice: Subject to any disclaimer, the term of this patent is extended or adjusted under 35 U.S.C. 154(b) by 1094 days.

(21) Appl. No.: 11/829,729

(22) Filed: Jul. 27, 2007

(65) Prior Publication Data

US 2009/0030711 A1 Jan. 29, 2009

(51) Int. Cl.
*G06F 17/30* (2006.01)
(52) U.S. Cl. ...................................................... 705/7.28
(58) Field of Classification Search .................. 705/7.28
See application file for complete search history.

(56) References Cited

U.S. PATENT DOCUMENTS

| 5,765,140 | A  | * | 6/1998  | Knudson et al. ............ 705/7.15 |
| 6,036,345 | A  | * | 3/2000  | Jannette et al. ................ 700/97 |
| 6,308,164 | B1 | * | 10/2001 | Nummelin et al. .......... 705/7.23 |
| 6,591,278 | B1 | * | 7/2003  | Ernst .................................. 1/1 |
| 6,678,671 | B1 | * | 1/2004  | Petrovic et al. ..................... 1/1 |
| 7,062,514 | B2 | * | 6/2006  | Harris ................................... 1/1 |
| 7,249,042 | B1 | * | 7/2007  | Doerr et al. .................. 705/7.23 |
| 7,257,768 | B2 | * | 8/2007  | Horikiri et al. ............... 715/229 |
| 7,305,392 | B1 | * | 12/2007 | Abrams et al. ................. 707/770 |
| 7,313,531 | B2 | * | 12/2007 | Chappel et al. .............. 705/7.17 |
| 7,318,038 | B2 | * | 1/2008  | Labbi ............................ 705/7.23 |
| 7,318,039 | B2 | * | 1/2008  | Yokota et al. ................ 705/7.17 |
| 7,359,865 | B1 | * | 4/2008  | Connor et al. ............... 705/7.28 |
| 7,546,346 | B2 | * | 6/2009  | Ouchi ............................ 709/206 |
| 7,565,643 | B1 | * | 7/2009  | Sweet et al. .................. 717/121 |
| 2005/0114829 | A1 | * | 5/2005 | Robin et al. .................. 717/101 |

(Continued)

FOREIGN PATENT DOCUMENTS

WO    0229692 A1    4/2002

OTHER PUBLICATIONS

Raz et al (Use and benefits of tools for project risk management), Jan. 2001, International Journal of Project Management), vol. 19, Issue 1, pp. 1-11.*

(Continued)

*Primary Examiner* — Romain Jeanty
(74) *Attorney, Agent, or Firm* — Banner & Witcoff, Ltd.; Michael A. Springs

(57) ABSTRACT

A method for completing a project includes several steps. A request for completing a project is received, including first information regarding the project. At least one person for completing the project is determined based on the first information. Second information regarding the project is also received, and instructions for completing the project are identified based on analysis of the second information. The instructions include a plurality of actions to be performed by the at least one person, including the creation of at least one document using a standardized template. The performance of the actions by the at least one person in completing the project is automatically tracked. A system suitable for performing the method is also disclosed, including a processor, a memory, and several components for performing the steps.

26 Claims, 5 Drawing Sheets

U.S. PATENT DOCUMENTS

2005/0283751 A1* 12/2005 Bassin et al. .................. 717/100
2006/0229921 A1   10/2006 Colbeck
2007/0271198 A1* 11/2007 Del Bianco et al. ........ 705/36 R

OTHER PUBLICATIONS

Chapman (Project risk analysis and management—PROM the generic process), Dec. 1997, International Journal of Project Management), vol. 15, No. 5, pp. 273-281.*

Artto et al (Project Management: Quest for Team Competence Software Project Management Organizitional Change as a Project Factors Impeding Project Management Learning), Dec. 1999, International Project Management Journal), pp. 1-85.*

Kwac et al (Project Risk Management: lessons learned from software development environment), Dec. 2004, Technovation, pp. 1-6.*

Shen (Project Risk Management in Hong Kong), Dec. 1997, International Journal of Project Management, vol. 15, No. 2, pp. 1-5.*

Couillard (The Role of Project Risk in Determining Project Management Approach), Dec. 1995, Project Management Journal, pp. 1-13.*

Dialog (Using risk reduction to measure team performance), Dec. 2001, Engineering Management Journal V13n4 pp. 27-34.*

Larson et al (Managing Design Processes: A Risk Assessment Approach), Nov. 1996, IEEE Transactions on Systems, Man and Cybernetics, vol. 26 No. 6, pp. 749-759.*

International Search Report, dated Dec. 31, 2008, Ref. International Application No. PCT/US2008/071150.

Written Opinion of the International Searching Authority, dated Dec. 31, 2008.

International Preliminary Report on Patentability for PCT Application No. PCT/2008/071150 mailed Feb. 11, 2010.

Office Action from GB application No. GB1002285.3 mailed Jul. 1, 2011.

* cited by examiner

PROJECT MANAGEMENT SYSTEM AND METHOD

TECHNICAL FIELD

The invention relates to a system and method for management of a project, and, in some aspects, to an automated system for managing data and guiding completion of a large number of projects throughout an institutional organization.

BACKGROUND

Institutions, including banks and other financial institutions, often have a large number of employees organized into many divisions and groups. With such a large number of employees, such institutions may encounter problems with consistent record keeping, as different divisions, groups, or individual employees may keep records differently. Similarly, business practices across the institution may also vary. Accordingly, a standardized record keeping process and a standardized process for completing work across the institution are desirable. Additionally, paper record keeping and traditional computerized workflow engines often result in inefficiency and the expenditure of unnecessary money and work hours. Accordingly, greater automation and a streamlined, centralized system controlling workflow can result in great financial benefit, particularly to a large institution. Smaller institutions would realize benefits from improvements in these areas as well.

SUMMARY

The present system and method are provided to solve the problems discussed above and other problems, and to provide advantages and aspects not provided by prior systems of this type. A full discussion of the features and advantages of the present invention is deferred to the following detailed description, which proceeds with reference to the accompanying drawings.

Aspects of the present invention relate to a method for completing a project that includes several steps. Information regarding the project is gathered and automatically analyzed, at a computer processor, to produce a score corresponding to at least one of an expected risk and an expected rigor associated with the project. Instructions for completing the project are identified based on the score. The instructions include a plurality of actions that are performed to complete the project. A system suitable for performing the method is also disclosed, including a processor, a memory, an input device, an output device, and components for performing the steps.

According to one aspect of the invention, the instructions are identified further based on a classification of the project.

According to another aspect of the invention, analyzing the information to produce a risk or rigor score associated with the project includes analyzing a plurality of inputs from the information to assign an impact value for each input and combining the impact values to produce the score.

Further aspects of the present invention relate to a method for completing a project that includes several steps. A request for completing a project is received, including first information regarding the project. At least one person for completing the project is determined based on the first information. Second information regarding the project is also received, and instructions for completing the project are identified based on analysis of the second information. The instructions include a plurality of actions to be performed by the at least one person, including the creation of at least one document using a standardized template. The performance of the actions by the at least one person in completing the project is automatically tracked. A system suitable for performing the method is also disclosed, including a processor, a memory, an input device, an output device, and components for performing the steps.

According to one aspect, determining at least one person for completion of the project includes several steps. A group for completing of the project, including a plurality of persons, is automatically determined based on the first information. The request is placed in a queue for the group, and at least one person is selected from the group when the request reaches a top of the queue.

According to another aspect, a plurality of different screen views for a plurality of persons monitoring the project are created based on a hierarchical rank of each person.

According to a further aspect, the system also includes a web portal, and the processor communicates with the input device and the output device through the web portal.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
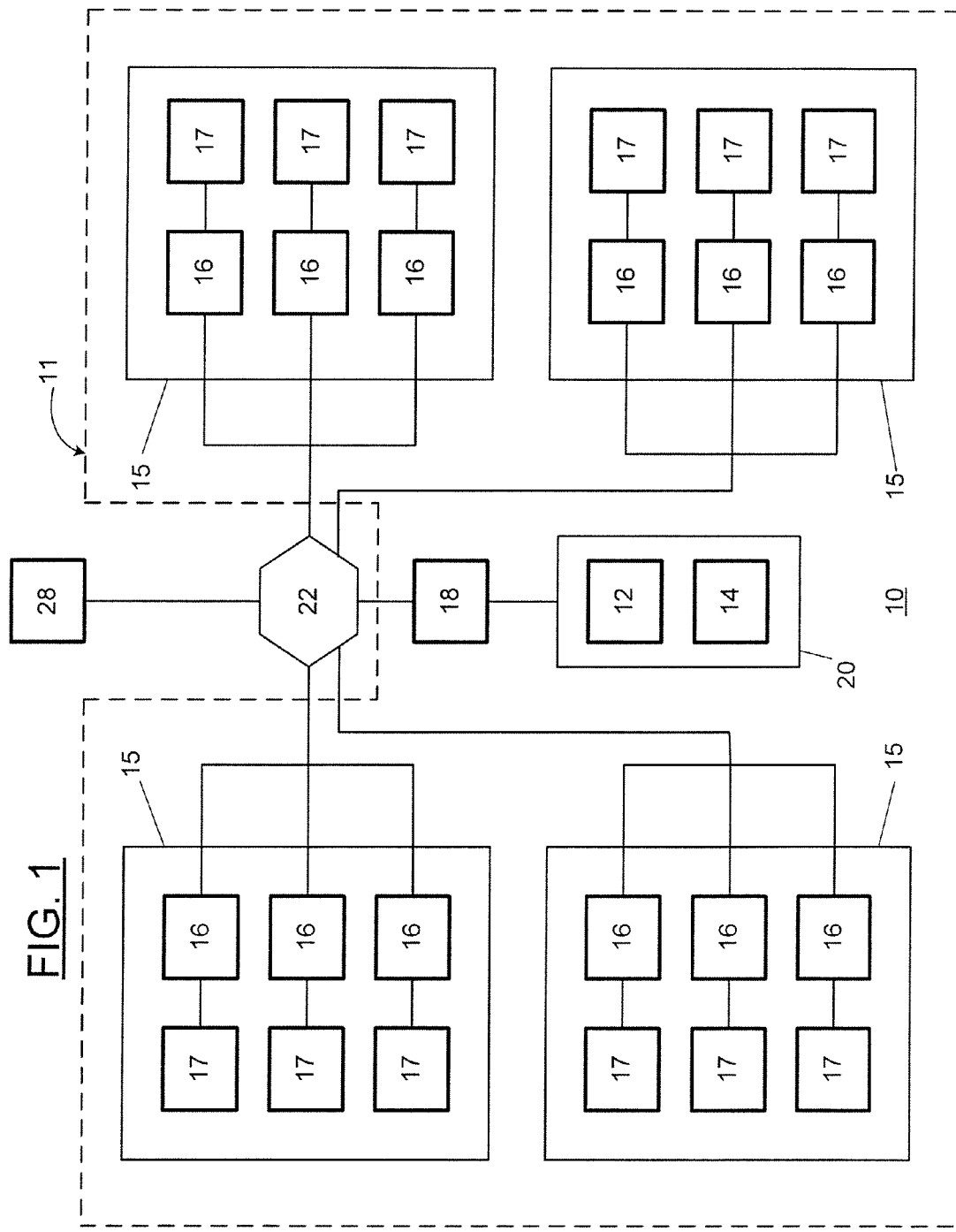
FIG. 1 is an illustrative schematic drawing illustrating one example of a project management system incorporated into a financial institution in accordance with at least one aspect of the present invention.

While this invention is susceptible of embodiments in many different forms, there are shown in the drawings and will herein be described in detail preferred embodiments of the invention with the understanding that the present disclosure is to be considered as an exemplification of the principles of the invention and is not intended to limit the broad aspect of the invention to the embodiments illustrated.

An exemplary embodiment of a project management system 10 is illustrated in FIG. 1, and generally includes a computer system 20, a plurality of input/output (I/O) devices 16, and a web portal 18. Each I/O device 16 has at least one associated user 17, such as an institutional employee, and communicates with the computer system 20 through the web portal 18. Portions of the system 10 are illustrated in FIG. 1 as being incorporated into a financial institution 11, such as a bank, having a plurality of divisions 15 with a plurality of institutional employees, such as users 17.

Figure 2:
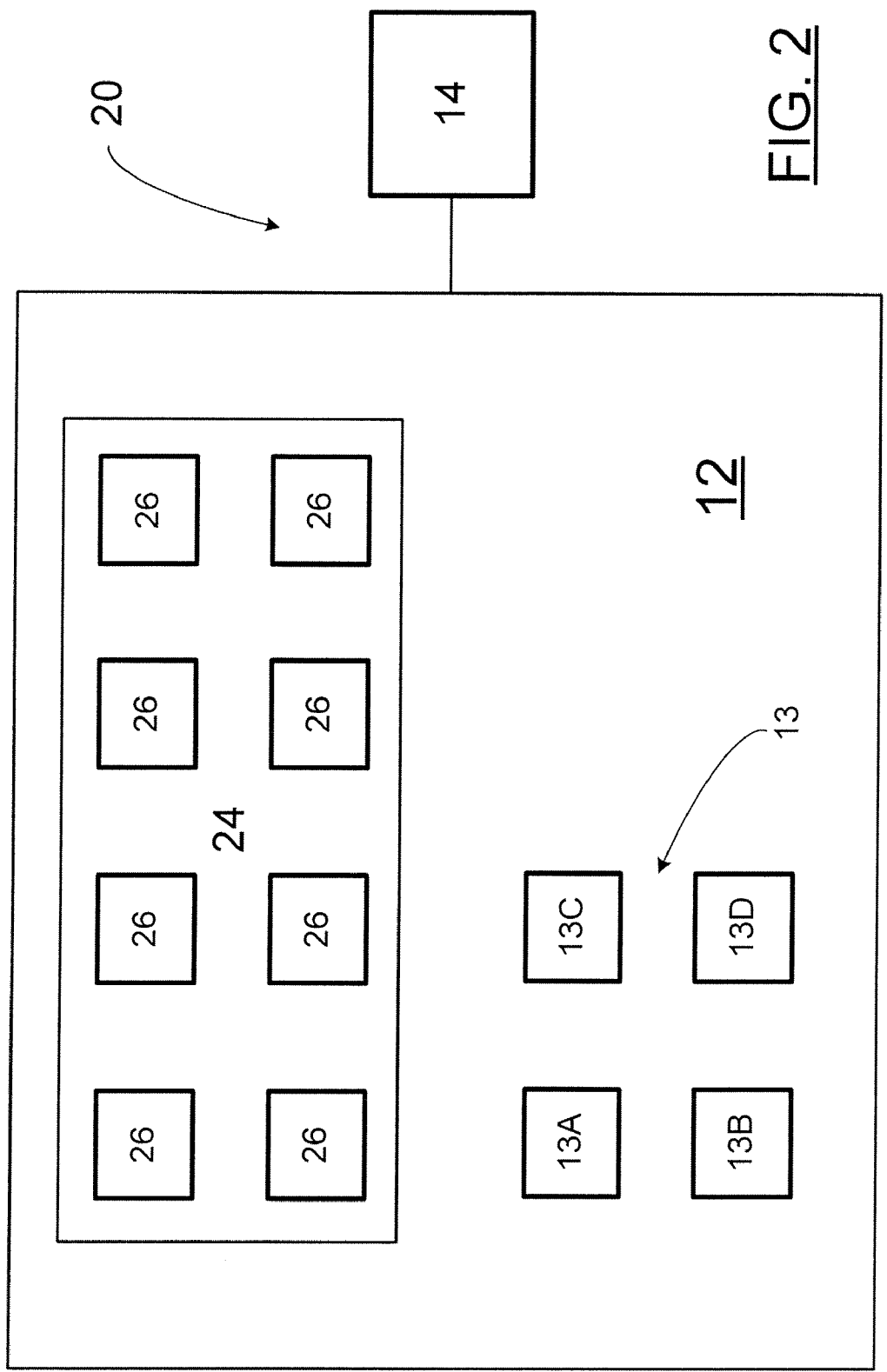
FIG. 2 is an illustrative schematic drawing illustrating a computer system of the project management system of FIG. 1 in accordance with at least one aspect of the present invention.

The computer system 20 is illustrated in greater detail in FIG. 2, and may be configured to include a processor 14 and a memory 12. It is understood that a computer system 20, single processor 14, and single memory 12 are shown and described for sake of simplicity, and that the computer system 20, processor 14, and memory 12 of the system 10 may include a plurality of computer systems, processors, and memories, respectively. In one embodiment, the system 20 contains a plurality of processors that are aggregated behind the portal 18 so as to appear transparent to a user interacting through the portal. The same is true of other computers and computer systems, processors, and memories referred to herein.

The memory 12 of the computer system 20 contains information 26, at least some of which may be received from I/O devices 16. This information 26 includes data and other information regarding each project that is to be performed in conjunction with the system 10. In one embodiment, the memory 12 may store the information 26 in a database 24 having a centralized table structure, as described in greater detail below. Additionally, the memory 12 supports program modules for one or more applications 13A-13D that may be executed by the processor 14 or other processors within the system 10. The applications 13A-13D may operate using the information 26 stored in the memory 12, and may be executed by the processor 14 or another processor (not shown) within the system 10. The system 10 may contain other applications (not shown) that are not located in the memory 12, which may operate using the information 26 stored in the memory 12. Certain such applications are described in greater detail below.

In the embodiment shown in FIG. 1, each I/O device 16 has at least one user 17 associated therewith to input information into, and receive information from, the I/O device 16. The I/O device 16 has input means, such as a mouse, keyboard, touchpad, audio input, etc., and output means, such as a monitor, audio output, etc. The I/O device 16 is in communication with the memory 12 and the processor 14, and can transmit input information and receive output information from the memory 12 and the processor 14. In the embodiment shown in FIG. 1, the I/O device 16 is a computer terminal, containing a memory, a processor, and one or more applications (not shown) therein or associated therewith. It is understood that the I/O device 16 can utilize the applications 13A-13D stored on the memory 12 as well. It is further understood that the system 10 may alternately include a plurality of input devices and a plurality of output devices instead of, or in addition to, the I/O devices 16.

In the embodiment illustrated in FIGS. 1-2, the system 10 is web-based, and includes a web portal 18 providing access to the system through a network 22, such as the Internet. The web portal 18 provides a communication channel to the memory 12 and the processor 14 of the computer system 20. As stated above, the I/O devices 16 can communicate with the memory 12 and the processor 14 through the web portal 18. In addition, the web portal 18 may include architecture for communication with the memory 12 and/or the processor 14 by external parties 28, including customers, vendors, and employees working remotely. Advantageously, the web portal 18 may allow for enhanced connectivity to the system 10, both by permitting access by a large number of different entities, and by allowing entities all over the world to connect to the system 10 simply by using a URL.

Figure 3:
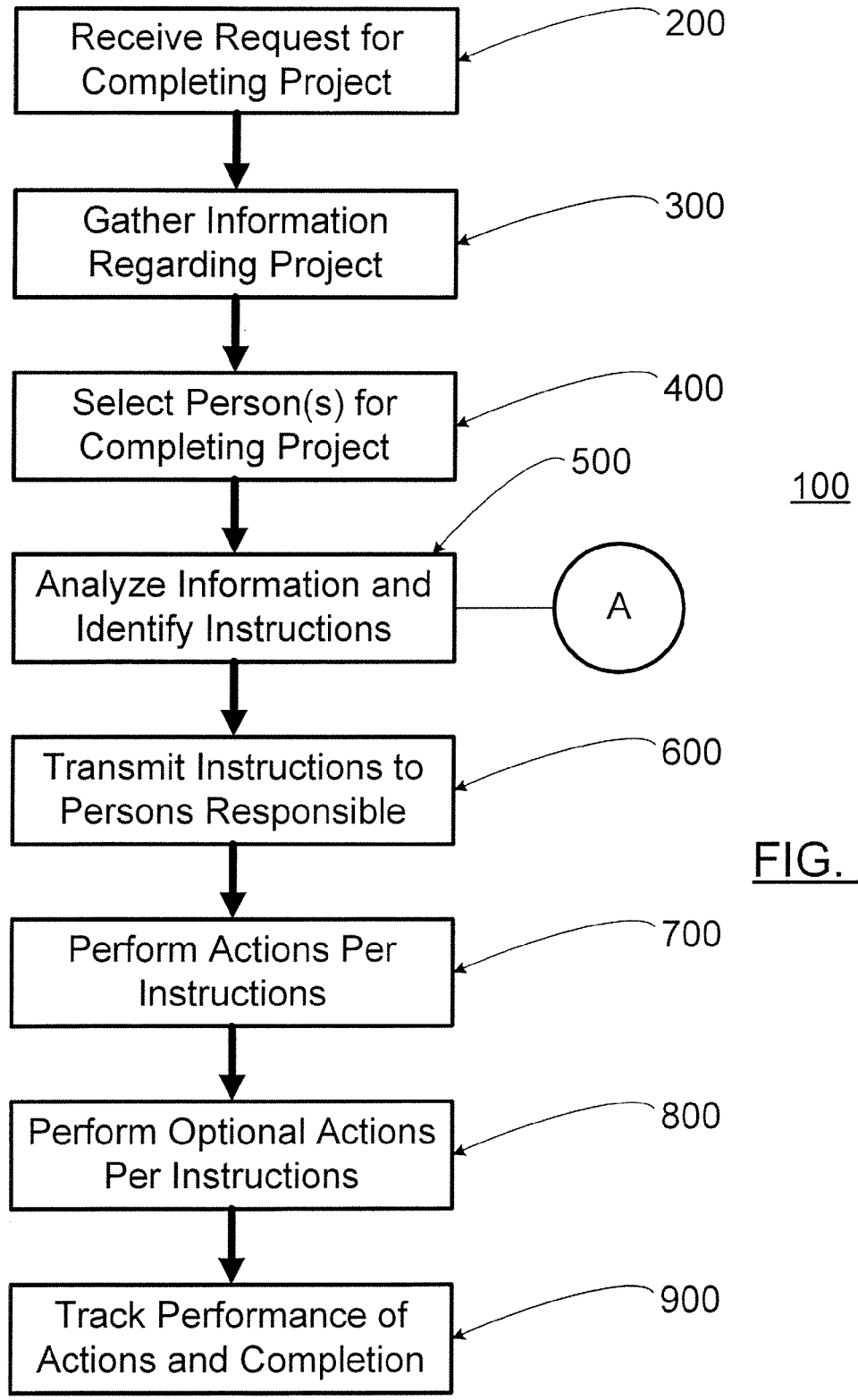
FIG. 3 is an illustrative flowchart depicting one embodiment of a method for completing a project in accordance with at least one aspect of the present invention.

The system 10 described herein is capable of use in performing the disclosed method for completing one or more projects within the financial institution 11. FIG. 3 illustrates one exemplary embodiment of the disclosed method 100. The method 100 may be used to manage workflow in the completion of a plurality of projects throughout an institution, even a very large institution like a bank. This is enabled, in part, based on the fact that the method and associated templates and documents can be customized. For example, these features can be customized for technology infrastructure such as networks, data center, server roll-out, etc. In an exemplary embodiment, the method manages workflow through a data-driven process. The number and type of projects that may be managed and completed using the disclosed method 100 are nearly limitless, and can be tailored based on algorithms. In some embodiments, the method 100 is used for completion of projects assigned to a single division 15 of the financial institution 11. However, in other embodiments, the method 100 may be used for completion of projects throughout an institution. In one exemplary embodiment, the method 100 is utilized by a network and computing support division. Such a division may receive projects that typically fall into one of several classifications or categories. One such classification is software-initiated projects, which involve implementing functionality for specific software. Another such classification is infrastructure improvement projects, which involve upgrades in infrastructure and hardware which may be large in scale. A further such classification is a maintenance project, which involve smaller improvements and upgrades to infrastructure and hardware. Other types of projects may be implemented as well, such as requests for asset, equipment, and other capital purchases. Such classifications can be scaled and matrixed to workflow within the confines of the system. In addition, various types of workflow and sub-processes can be encountered in the above-mentioned projects, including, but not limited to initial division engagement, project set-up, project status tracking, resource engagement, ordering and requesting external resources, procurement, estimation, forecasting, financial tracking, and capacity planning. As described above, in one exemplary embodiment, a single portal provides input and access to and for all such processes and sub-processes.

Generally, one of the first steps in the method 100 is receiving a request for completing a project, at step 200. In the system 10 of FIGS. 1-2, the request is received by the processor 14. Such a request may come from one of many sources, including a third-party customer 28 or an institutional employee 17 within or outside the division 15 designated to complete the project. Additionally, some such requests may be received through the web portal 18 from an internal or external source, and some such requests may be received by an institutional employee 17, who may then submit the request. In one exemplary embodiment, a request for completing the project by a designated division 15 may be a two-step process, which includes an engagement request from another division 15 or from a third-party 28 to the division designated to complete the project, followed by a project setup request from a person within the designated division. The request may be received from an input device within the system 10, such as one of the I/O devices 16. In one embodiment, certain project requests may be initiated as "ideas", which constitute a preliminary form of a project. The system 10 can track such idea-type project requests, but few or no actions may be performed in furtherance of such ideas until the idea matures into a project. It is understood that the record data may identify the project request as an idea, and the system 10 can automatically begin further steps in furtherance of the project request when the data is updated to reflect that the idea has changed into a project.

In conjunction with receiving the request for completing the project, the system 10 may implement certain intake procedures. For example, certain projects must be approved before entry into the system 10, for example, when such projects involve high capital expenditures, require a large number of hours, or have a broad range of impact. This approval control may be done via an automated process that occurs after registration, allowing for quick response and control over the portfolio, as part of a "straight through" processing arrangement, which is then backended by algorithmic compliance queries. The straight through processing minimizes project initiation timeframes and overall project duration by filtering critical work based on algorithms.

One such intake procedure is receiving or gathering information/data regarding the project, at step 300, which may also be referred to as data building. The information may be received from a single source, such as the person requesting the project, or from a plurality of sources. The information may be received from an input device within the system 10, such as one of the I/O devices 16. Additionally, at least some of the information may be received through forms or lists of questions that are filled out by appropriate persons. Such forms may have information fields having a limited number of choices from which a user can select, and thus, having a limited number of potential contents, simplifying the acquisition and processing of the information. These limited information fields may be in the form of drop-down menus. The web portal 18 enables information gathering through online forms. Some other information may be received through automatic generation by the processor 14 through the use of algorithms and/or matrices in connection with information already received. The type of information received may be adapted based on characteristics of the method. In some examples, the information received may include, without limitation: an identity of the project, a source of the project, a type and nature of the project and process path, an estimated cost of the project, a number of critical-to-quality variables affected, a number of lines of business affected or impacted, a number of products impacted, a number of systems impacted, a number of applications impacted, an extent or degree of potential external customer impact, a likelihood of benefit realization, an amount or degree of potential cost or expense reduction, an amount or degree of potential revenue improvement, an amount of potential incremental cost avoidance, a confidence level of the availability of required resources, a level of technical complexity, a degree of potential reduction in legal risk, a degree of potential reduction in regulatory risk, a number of internal associates or employees affected or impacted, revenue capabilities, and expense reduction. Generally, the information 26 is received by the processor 14 through the web portal 18 and is stored in the memory 12, and all data or information associated with a particular project can be referred to as "record data." In some embodiments, the information can be gathered using controlled validation rules and various data control methodologies to facilitate "straight through" processing, as described above.

Another such intake procedure is determining at least one person for completing the project based on at least some of the information received, at step 400. The selection of the person (s) for completing the project 400 may be done either automatically (such as by the processor 14) or manually, or by a combination of automatic and manual methods. In one exemplary embodiment, the selection 400 is done in several steps. First, a group for completing the project is determined, and then the project is assigned to at least one person from the group. The group determination and selection steps may be done automatically by the processor 14, based on at least some of the information, or may be done by manual designation. In one embodiment, the request is placed in a queue for the group after automatic determination of the proper group. The queue generally shows the projects assigned to the particular group and may contain a clock or timer function to ensure that requests are processed in satisfactory time. When the time comes for processing the request from the queue, the project is assigned to the at least one person either manually or automatically. In one exemplary embodiment, an algorithm is used to determine a number of groups or persons to be involved in completing the project, based on the expected risk and/or the expected rigor of the project. Calculation of the expected risk and rigor is described below.

In one exemplary embodiment, the proper group(s) and/or persons(s) to handle a project can be automatically determined based on a source of the project request. This automatic determination may be accomplished by a distributed relationship matrix that is maintained in the memory 12. The relationship matrix defines responsibilities for a plurality of persons and/or groups, thus providing a defined path for determining the proper group and/or person to handle the project based on the source of the request. The matrix can contain information regarding many or all persons, groups, and/or divisions within an institution, and can provide connections and hierarchal assignments for many or all of said persons, groups, and/or divisions. Such a matrix can be maintained real-time and driven by hierarchal assignment, and can dynamically update the system when changes are made to the matrix. For example, when the identity and/or position of a person in the matrix is changed (through promotion, termination, creation of a new position, etc.), the system 10 can automatically update the information for each project associated with the person to reflect the change in the matrix and the resultant change in responsibility.

After the information is gathered 300, instructions for completing the project are identified based on analysis of at least some of the information, at step 500. In one embodiment, the content of the information/record data stored in the memory 12, specific to each project, drives the identification of the appropriate instructions for completing the project. In other words, algorithms can be used to automatically analyze the information and identify instructions based on the information. In one embodiment, some or all of the information associated with a project can be in table format, and algorithms are applied, using information from specific fields in the table, to generate the instructions. The fields in such a table may be limited in nature (i.e., having a limited number of potential contents), as described above. It is understood that, while a single table corresponding to each project is discussed herein, the single table can be represented by two or more smaller tables. In such an embodiment, the system is capable of handling any project methodology, because the instructions for completing each project are generated through the present state of the data.

Figure 4:
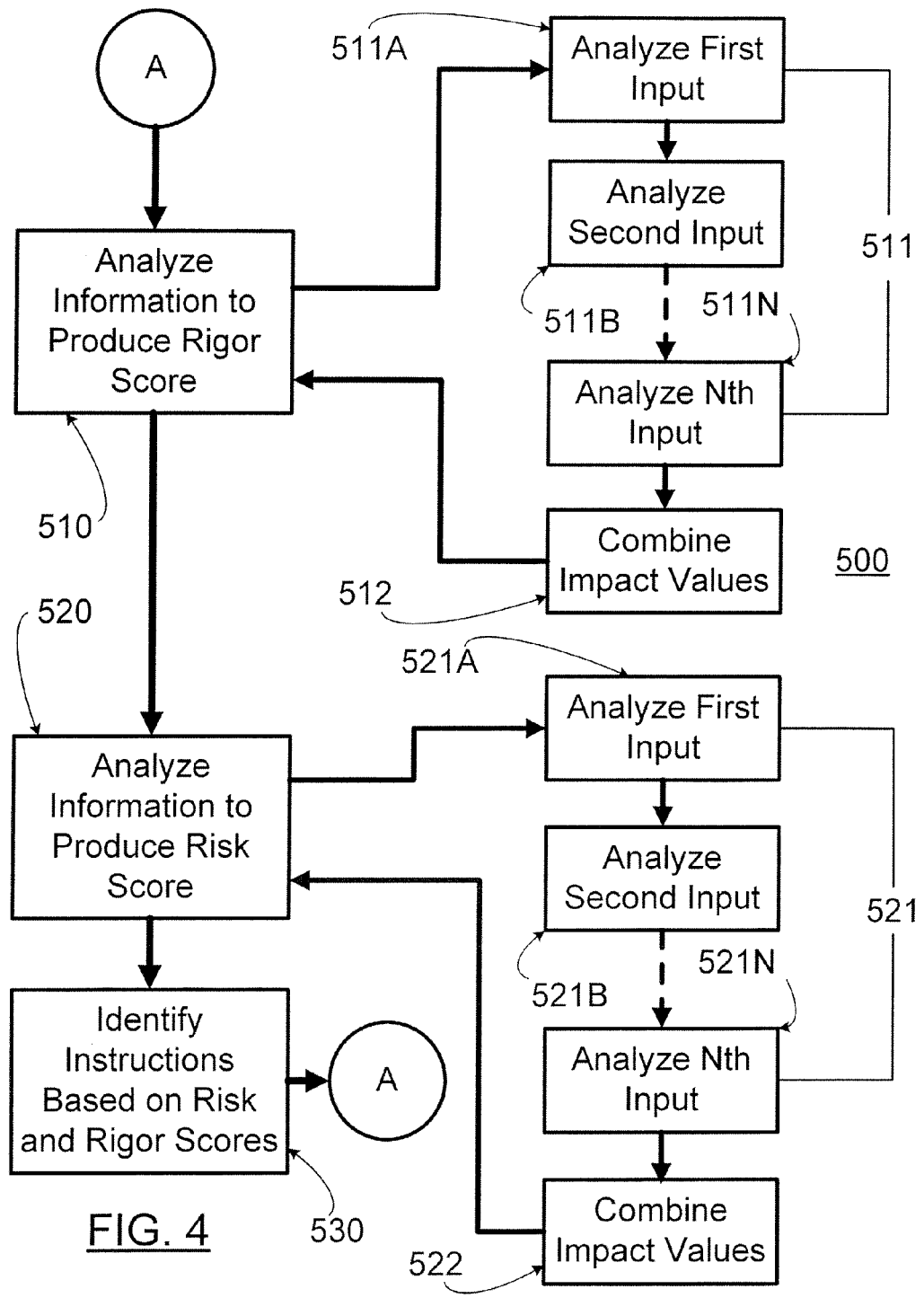
FIG. 4 is an illustrative flowchart depicting one embodiment of a method for performing step 500 in the flowchart of FIG. 3 in accordance with at least one aspect of the present invention.

In one exemplary embodiment, the instructions are identified by the processor 14 based on an expected risk and/or an expected rigor of the project. FIG. 4 shows a flowchart depicting an exemplary embodiment of such a method for analyzing the information and identifying the instructions 500. Some of the gathered information is analyzed to produce a score corresponding to an expected rigor associated with the project, at step 510. The expected rigor, as used herein, refers to such considerations as expected difficulty, cost, time and resource consumption, size, etc., associated with completing the project. Accordingly, the information used in calculating the rigor score includes a plurality of rigor inputs such as: an estimated cost of the project, a number of critical-to-quality variables affected, a number of lines of business affected, a number of products impacted, a number of systems impacted, a number of applications impacted, an extent of external customer impact, a likelihood of benefit realization, an amount of potential expense reduction, an amount of potential revenue improvement, and an amount of potential incremental cost avoidance. An algorithm may be used to determine the rigor score. In the embodiment illustrated, the rigor score is calculated through first analyzing a plurality of the inputs to assign a rigor impact value for each input, at step 511. As illustrated, an unspecified number N of inputs are considered in determining the rigor score, and the method analyzes each of the inputs separately, at sub-steps 511A, 511B, . . . 511N. After the impact values for each input are calculated, the rigor impact values are combined to produce a rigor score, at step 512. In one exemplary embodiment, the combining is performed by simple summing. However, in other embodiments, the combining can be performed by other mathematical algorithms, such as calculating the arithmetic or geometric mean, median, or mode of the values, or performing a more complex algorithm.

Some of the gathered information is also analyzed to produce a score corresponding to an expected risk associated with the project, at step 520. The expected risk, as used herein, refers to such considerations as the probability of success, the relationship between the potential benefits and the potential costs, etc., associated with completing the project. Accordingly, the information used in calculating the risk score includes a plurality of risk inputs such as: a confidence level of the availability of required resources, a level of technical complexity, a degree of potential cost reduction, a degree of potential revenue improvement, a degree of potential reduction in legal risk, a degree of potential reduction in regulatory risk, a degree of potential customer impact, a number of internal associates impacted, and a number of lines of business impacted. An algorithm may be used to determine the risk score. In the embodiment illustrated, the risk score is calculated through first analyzing a plurality of the inputs to assign a risk impact value for each input, at step 521. As illustrated, an unspecified number N of inputs are considered in determining the risk score, and the method analyzes each of the inputs separately, at sub-steps 521A, 521B, . . . 521N. After the impact values for each input are calculated, the risk impact values are combined to produce a risk score, at step 522. In one exemplary embodiment, the combining is performed by simple summing. However, in other embodiments, the combining can be performed by other mathematical algorithms, such as calculating the arithmetic or geometric mean, median, or mode of the values, or performing a more complex algorithm.

The risk and rigor score can be expressed in a number of different ways. In some examples, the risk or rigor score can be a number generated based on the information, a letter grade (A, B, C, etc.), or a simple "High," "Medium," or "Low" rating. In one exemplary embodiment, the information is collected through online templates or forms allowing selection between several pre-formed answers, and impact values are assigned to each pre-formed answer for use in determining the risk and/or rigor score. Additionally, the impact value assigned to each pre-formed answer can be expressed in the same manners as the risk and rigor scores. Accordingly, in one embodiment, the impact values are expressed in terms of "High," "Medium," and "Low." In this embodiment, combining the impact values may be done by setting terms wherein a certain number or percentage of "High," "Medium," or "Low" values will result in a specific risk or rigor score. After the risk and rigor score are determined, the instructions for completing the project are identified based on the risk and rigor scores, at step 530. In one exemplary embodiment, the risk and rigor scores are automatically calculated using an application executed by the processor 14 or an I/O device 16, and the instructions are identified manually based on the scores. Additional information beyond the risk and rigor scores may also be used in identifying the instructions, including a classification of the project, such as the source of the request or the type or nature of the project or its funding source.

The instructions for completing the process, identified at step 500, can be nearly any type of instructions, based upon the nature of the project to be completed and the type of institution or division involved. Artifacts may also be identified with the instructions, and the instructions and artifacts may be matrixed to projects and/or deliverables in order to mitigate risk and compress project duration. Generally, a plurality of actions must be taken by one or more associated persons in order to complete the project, and the instructions contain a description of each of the plurality of actions. Additionally, the instructions may be laid out in rules-based workflow. Further, some or all of the actions may each have a plurality of smaller steps that must be accomplished to perform the action, and may have other criteria which must be satisfied for completion of the action. In one exemplary embodiment, at least some of the actions contain at least four separate steps for performance: (1) satisfying entry criteria, (2) performing at least one task, (3) approval by a person of authority, and (4) satisfying exit criteria. Further, the instructions may contain one or more optional actions or steps which may be performed in the course of performing the method, but are not required to be performed. In some embodiments, at least one of the actions for each project include producing or creating documents as records of the project. In one exemplary embodiment, many documents are produced in the course of the project using standardized templates stored in the memory 12.

In some embodiments, the instructions may contain a document such as a flowchart or process flow diagram depicting an order of the actions necessary to complete the project. This document may be an electronic document. Such an electronic document may contain a drop-down menu associated with at least one of the actions, where the drop down menu can be activated by a person to display the plurality of steps, such as through clicking a box corresponding to the action with a mouse. Additionally, such a process flow diagram may be produced in the form of a "swimlane" document, indicating which persons or groups are responsible for each action. The process flow path provides a general framework for progression in completing the project, but individual actions and steps in the process flow path may be completed in different ways based on the risk and rigor scores. In one embodiment, all requests of a certain type follow the same general process flow path, and the instructions may change by the nature of the documents produced during the process flow path. For example, for a high-risk and/or high-rigor project, a large amount of documentation must be produced. However, in a low-risk and/or low-rigor project of the same type, production of some of such documents may be optional or not required, and others of such documents may be consolidated together into less numerous and less detailed summary documents.

After the instructions have been identified 500, the processor 14 transmits the instructions to one or more persons for performing the actions to complete the project, at step 600. Transmission of the instructions 600 can be done through the web portal 18 in the system 10 shown in FIG. 1. The information may be transmitted to an output device within the system 10, such as one of the I/O devices 16. Further, the transmission of the instructions 600 can be done proactively, such as by generation of an email or other notification containing the instructions, or reactively, such as in response to a request by the person for the instructions, or a combination of such techniques. In one embodiment, a person can utilize the applications 13 discussed below for accessing the appropriate instructions.

Once the person or persons responsible for performing the actions have received the instructions, the actions, steps, and other tasks necessary to complete the project can be performed by the person(s), at step 700. The process flow or flowchart documents can be used by a person in performing the actions. As stated above, such performance may include the creation or production of one or more documents using standardized templates. Additionally, the at least one person can optionally perform the optional actions or steps contained in the instructions, at step 800. Once all the actions and steps have been completed, the project is complete, and can be recorded as completed in the memory 12.

At step 900, the system 10 automatically tracks the performance of the actions and steps by the at least one person in completing the project. In one exemplary embodiment, this tracking is performed throughout the process, whenever an action or step is performed, and records of this tracking are stored in the memory 12. Additionally, records of documents created or produced in the course of completing the project are typically kept in conjunction with such tracking and associated to the project record. When the documents produced are electronic documents, copies of such documents can be stored in the memory 12 and presented via various controlled views and extracts. Further, the performance tracking may include recording of the duration between events, which may be used to monitor improvement in project management and completion.

The processor 14 may automatically generate notifications, including emails, to appropriate persons at certain points in the process. For example, emails may be generated to notify the person or persons of assignment of a project, to notify management persons in a group when the project is assigned to the group, or to notify appropriate persons when a particular action, step, or project is completed. Such notifications may also take the form of "alerts," which notify appropriate persons when projects, actions, or steps are coming due or overdue, and can be customized for any event within the system. Additionally, triggers for these alerts can be set for any occurring event or user interaction within the system.

As stated above, FIGS. 2-3 illustrate an example of one or more aspects of a method for processing security interest releases. The steps of the method described above can be accomplished by means and/or components contained within the system 10, such as the institutional employees 17, memory 12 and processor 14 of the computer system 20, or a combination of employees 17 and computer components. It is understood that means for "automatically" performing actions or functions imply actions by automated and/or computerized components, such as the memory 12, processor 14, and/or I/O devices 16, and do not incorporate significant action by institutional employees 17 or other significant manual effort. Additionally, the web portal 18 constitutes one means for receiving, transmitting, and other electronic communication-related actions and functions described herein. Mail and other physical shipping methods constitute possible means for non-electronic communications. Alternate communication means may also be used. Other components of the system 10 and the financial institution 11 may also constitute means for accomplishing aspects of the present invention, as understood by those skilled in the art. It is understood that the financial institution 11 may not perform each and every aspect of the present invention and that the institution 11 may outsource aspects to one or more other entities.

Aspects of the present invention are operational with numerous other general purpose or special purpose computing system environments or configurations. Examples of well known computing systems, environments, and/or configurations that may be suitable for use with the present invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the present invention may be described in the general context of computer-executable instructions, such as program modules, being executed by a computer. Generally, program modules include routines, programs, objects, components, data structures, etc. that perform particular tasks or implement particular abstract data types. The present invention may also be practiced in distributed computing environments where tasks are performed by remote processing devices that are linked through a communications network. In a distributed computing environment, application program modules may be located in the memory 12, which may include both local and remote computer storage media including memory storage devices. It is understood that connections and communications disclosed herein may be made by any type of wired or wireless connection or communication.

As stated above, the system 10 contains a plurality of applications that operate using the information stored in the memory 12, including the applications 13 in the memory 12. In the embodiment illustrated in FIGS. 1 and 2, the memory 12 includes several such applications 13, which are described in greater detail below. Such applications 13 can represent components of the system 10 for performing one or more of the steps of the method described above.

One application contained in the system 10 of FIGS. 1-2 is a portfolio utility tool 13A, which is can perform automated project and workflow management and tracking. In one exemplary embodiment, although the portfolio tool 13A is represented as a single application, the portfolio tool 13A contains a collection of smaller applications, rather than one large application. The portfolio tool 13A can aggregate these applications, as well as other applications 13 throughout the system 10, and provide connections to such applications to simplify operation of the system.

The portfolio tool 13A can provide a platform for automation of many of the steps of the method 100 disclosed herein, including steps that require user interfacing. In certain embodiments, the portfolio tool 13A can provide interfaces for receiving project requests (step 200), receiving information (step 300), assigning the responsible person or group (step 400), transmitting information related to the project (step 600), and tracking performance (step 900), as well as other steps, such as generating notifications. For example, the portfolio tool 13A can provide for automated recording of the completion of actions for each project, including time stamps, and automated storage and archiving in the memory 12 of documents produced in the course of such actions. In one exemplary embodiment, the portfolio tool 13A does not pass data along during workflow progress, but rather, uses queries to search for appropriate data profiles within the information stored in the memory 12. The portfolio tool 13A then routes records meeting specified data profiles to the next stop in the process. This feature provides many benefits, such as ensuring high data quality, facilitating changes in functionality by adapting to new applications, and enabling rapid customization and good scalability. In the course of workflow, the portfolio tool 13A can also be configured to automatically fill a portion of a document with data by querying the memory 12 for one or more specified data profiles, and then filling the document with the data corresponding to the profile.

The portfolio tool 13A can provide a variety of other features for interaction with the memory 12 and processor 14. For example, the portfolio tool 13A can provide login, registration, user access, security, and system logging features. In another example, the portfolio tool 13A can provide hierarchical structures governing access and reporting in connection with project completion. The portfolio tool 13A may provide different access, screen views, and functionality for different users of the portfolio tool 13A, based on a management level or other hierarchical designation of each user. Thus, each user may be presented with a filtered view of the project, representing a hierarchical view. The filtering can be driven by record based profiling, where the record data itself defines the screen view which each user is presented, to ensure maximum viewing flexibility and fungibility. In a further example, the portfolio tool 13A can provide for navigation of all portfolios in the system 10, including monitoring of the status of projects and viewing budgets, actuals, and forecasts, as well as offering customized output and reporting formats and providing for requests for resources and capital equipment purchases. An engine for receiving information and determining the risk and rigor scores (step 500) may be included as a portion of the portfolio tool 13A. Still further sub-applications and functionality can be provided by the portfolio tool 13A.

Another application contained in the system 10 of FIGS. 1-2 is an online manual 13B. The online manual 13B provides links to resources for completing a project. For example, instructions for completing the project, including process flow and flowchart documents, can be linked by the online manual 13B. The online manual 13B can provide a user interface for such instruction documents, including functionality for drop-down menus. Links to glossaries and supplemental instructions can be provided from the online manual 13B as well. In another example, the online manual 13B can provide links to applications and other tools that are necessary or helpful in performing certain actions in the course of completing the project.

Figure 5:
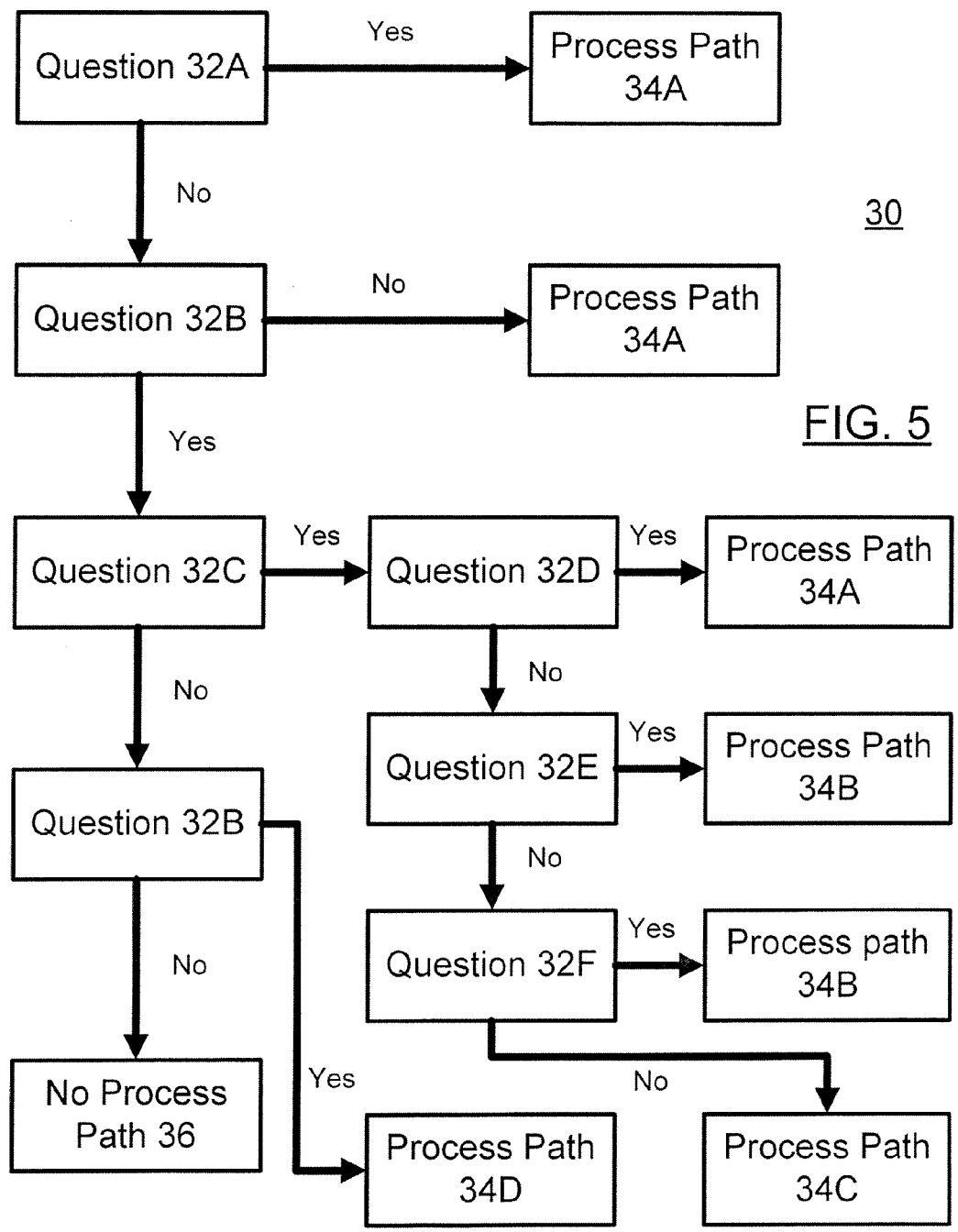
FIG. 5 is an illustrative decision tree flowchart for identifying a process flow path in accordance with at least one aspect of the present invention.

The system 10 of FIGS. 1-2 also contains a document master list application 13C. The document master list 13C provides a link to documents involved in the process of completing the project, such as templates and forms to be completed. The document master list 13C provides links to the most up-to-date versions of templates and forms, ensuring correct completion of each project. Examples of completed documents and templates may also be linked for assistance purposes. Additionally, the document master list 13C can provide access to some or all of the instructions for completing a project, as well as links to other applications, such as the online manual 13B and the decision tree 13D. For example, the document master list 13C provides a link to a glossary, user manuals, and detailed flowcharts and process flow diagrams. In another example, the document master list 13C provides links to web-accessible training materials for institutional employees, such as instructional voice-over slide presentations. In a further example, the document master list 13C provides a link to a "decision tree" for assistance in identifying the instructions for completing the project. For projects that follow an established process flow path, the decision tree provides a flowchart for determining the appropriate process flow path. By following the decision tree and answering "yes" or "no" to the questions posed, a person can manually determine which of a variety of established process flow paths is appropriate for completion of a given project. A general example of such a decision tree 30 is shown in FIG. 5, and contains a plurality of decisions 32 leading a user to one of a plurality of designated process paths 34. As illustrated, different paths through the decision tree 30 can lead to the same designated process path 34, for example, paths 34A and 34B. The decision tree 30 also accounts for the possibility that the project may not fit an established process path, indicated by step 36.

Another application contained within the system 10 is a library application 13D. The library application 13D provides a single source for access to an archive of all documents, templates, and forms completed in the process of completing each project, organized by project. The library application 13D may also provide access to historical templates and forms that are no longer used or have been revised.

The system 10 and method 100 disclosed herein provide a number of benefits, whether incorporated into a financial institution 11 or a different type of institution. The system 10 and method 100 are both easily scalable for different institutions and for large or small projects within an institution. Through a high degree of automation, the system 10 and method 100 provide greater efficiency and time savings. The standardized forms and templates reduce or eliminate inconsistency between different divisions or groups, and individual employees that can occur without standardized documentation. Likewise, the standardized instructions provide consistency in performance and in the documents and records kept of each project. The web portal 18 provides enhanced access, and the applications 13 described herein provide a simplified and more functional user interface. The system 10 and applications 13 therein provide a centralized tool for tracking, reporting, and storage of documentation. Still other advantages are readily recognized by those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," etc., as used herein, are intended for illustrative purposes only and do not limit the embodiments in any way. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A computer-assisted method for completing a project comprising:
   gathering, at a computer processor, information regarding the project;
   automatically analyzing the information, by the computer processor, to produce a risk score corresponding to an expected risk associated with the project, wherein the information analyzed to produce the risk score comprises information selected from the group consisting of: a confidence level of the availability of required resources, a level of technical complexity, a degree of potential cost reduction, a degree of potential revenue improvement, a degree of potential reduction in legal risk, a degree of potential reduction in regulatory risk, a degree of potential customer impact, a number of internal associates impacted, and a number of lines of business impacted;

automatically analyzing the information, by the computer processor, to produce a rigor score corresponding to an expected rigor associated with the project, wherein the information analyzed to produce the rigor score comprises information selected from the group consisting of: an estimated cost of the project, a number of critical-to-quality variables affected, a number of lines of business affected, a number of products impacted, a number of systems impacted, a number of applications impacted, an extent of external customer impact, a likelihood of benefit realization, an amount of potential expense reduction, an amount of potential revenue improvement, and an amount of potential incremental cost avoidance;

identifying instructions for completing the project, using the computer processor, based on the risk score and the rigor score, the instructions comprising a plurality of actions; and transmitting at least a portion of the instructions from the computer processor to an output device to enable a person to perform at least some of the actions to complete the project.

2. The method of claim 1, wherein the information is gathered by a method comprising:

generating an online form having a plurality of questions and pre-formed answers to the questions; and receiving the information through selection, by a user, of one pre-formed answer to each of the questions.

3. The method of claim 2, wherein at least one of the risk score and the rigor score is produced by a method comprising:

assigning an impact value to each of the pre-formed answers; and combining the impact values to produce the score.

4. The method of claim 1, wherein the instructions further comprise at least one optional action.

5. The method of claim 1, wherein at least one of the actions comprises a plurality of steps and performing the action comprises performing the plurality of steps.

6. The method of claim 1, further comprising:

providing a document comprising a flowchart depicting at least a portion of the instructions and an order for completing the plurality of actions.

7. The method of claim 6, wherein at least one of the actions comprises a plurality of steps, and wherein the document is an electronic document comprising a drop-down menu associated with the at least one action, the drop-down menu being capable of activation by a person to display the plurality of steps.

8. The method of claim 1, wherein analyzing the information to produce at least one of the risk score and the rigor score comprises:

analyzing a plurality of inputs from the information;

assigning an impact value for each input; and combining the impact values to produce the score.

9. The method of claim 1, wherein the instructions are identified further based on a classification of the project.

10. The method of claim 1, wherein each action is to be performed by:

satisfying entry criteria;

performing at least one step;

receiving approval by a person of authority; and satisfying exit criteria.

11. The method of claim 1, wherein at least some of the actions are to be performed by creating at least one document using a standardized template, and the instructions include a reference to the standardized template.

12. The method of claim 1, further comprising:

identifying at least one person to perform the action, based on the information.

13. The method of claim 1, wherein at least a portion of the instructions are identified manually.

14. A system comprising:

an input device adapted to receive information;

an output device adapted to convey information to a person; and a processor in communication with the input device and the output device, the processor configured to perform the steps of:

receiving, from the input device, first information regarding a project to be completed;

analyzing the first information to produce a risk score corresponding to an expected risk associated with the project, wherein the information analyzed to produce the risk score comprises information selected from the group consisting of: a confidence level of the availability of required resources, a level of technical complexity, a degree of potential cost reduction, a degree of potential revenue improvement, a degree of potential reduction in legal risk, a degree of potential reduction in regulatory risk, a degree of potential customer impact, a number of internal associates impacted, and a number of lines of business impacted;

analyzing the first information to produce a rigor score corresponding to an expected rigor associated with the project, wherein the information analyzed to produce the rigor score comprises information selected from the group consisting of: an estimated cost of the project, a number of critical-to-quality variables affected, a number of lines of business affected, a number of products impacted, a number of systems impacted, a number of applications impacted, an extent of external customer impact, a likelihood of benefit realization, an amount of potential expense reduction, an amount of potential revenue improvement, and an amount of potential incremental cost avoidance, and wherein instructions for completing the project are identified based on the risk score and the rigor score, the instructions comprising a plurality of actions; and transmitting, to the output device, second information comprising at least a portion of the instructions, enabling the person to perform the actions to complete the project.

15. The system of claim 14, wherein the first information is received by generating an online form having a plurality of questions and pre-formed answers to the questions, and receiving the information through selection, by a user, of one pre-formed answer to each of the questions.

16. The system of claim 15, wherein at least one of the risk score and the rigor score is produced by assigning an impact value to each of the pre-formed answers, and combining the impact values to produce the score.

17. The system of claim 14, wherein the instructions further comprise at least one optional action, and the instructions further enable the person to perform the at least one optional action to complete the project.

18. The system of claim 14, wherein at least one of the actions comprises a plurality of steps and the instructions enable the person to perform the plurality of steps.

19. The system of claim 14, wherein the processor is further configured to perform the step of:
providing a document comprising a flowchart depicting the instructions and an order for completing the plurality of actions.

20. The system of claim 19, wherein at least one of the actions comprises a plurality of steps, and wherein the document is an electronic document comprising a drop-down menu associated with the at least one action, the drop down menu being capable of activation by the person to display the plurality of steps.

21. The system of claim 14, wherein analyzing the information to produce at least one of the risk score and the rigor score comprises:
analyzing a plurality of inputs from the information;
assigning an impact value for each input; and
combining the impact values to produce the score.

22. The system of claim 14, wherein the instructions are identified further based on a classification of the project.

23. The system of claim 14, wherein the instructions enable the person to create at least one document using a standardized template in performing each action, and the instructions include a reference to the standardized template.

24. The system of claim 14, wherein the processor is further configured to perform the step of:
identifying the person to perform the action from a plurality of potential persons.

25. The system of claim 14, further comprising a web portal, wherein the processor is connected to the input device and the output device through the web portal.

26. The system of claim 14, wherein at least a portion of the instructions are identified manually.

* * * * *